(12) United States Patent
Benisty et al.

(10) Patent No.: US 11,983,442 B2
(45) Date of Patent: May 14, 2024

(54) DATA STORAGE DEVICE AND METHOD FOR MULTI-LEVEL CONDITIONAL PREDICTION OF FUTURE RANDOM READ COMMANDS

(71) Applicant: Western Digital Technologies, Inc., San Jose, CA (US)

(72) Inventors: Shay Benisty, Beer Sheva (IL); Ariel Navon, Revava (IL)

(73) Assignee: Western Digital Technologies, Inc., San Jose, CA (US)

( * ) Notice: Subject to any disclaimer, the term of this patent is extended or adjusted under 35 U.S.C. 154(b) by 28 days.

(21) Appl. No.: 17/846,335

(22) Filed: Jun. 22, 2022

(65) Prior Publication Data

US 2023/0418515 A1 Dec. 28, 2023

(51) Int. Cl.
*G06F 3/06* (2006.01)
*G06F 12/0862* (2016.01)

(52) U.S. Cl.
CPC .......... *G06F 3/0659* (2013.01); *G06F 3/0611* (2013.01); *G06F 3/0613* (2013.01); *G06F 3/0673* (2013.01); *G06F 12/0862* (2013.01); *G06F 2212/6024* (2013.01); *G06F 2212/6026* (2013.01)

(58) Field of Classification Search
None
See application file for complete search history.

(56) References Cited

U.S. PATENT DOCUMENTS

| | | | |
|---|---|---|---|
| 10,732,848 B2 | 8/2020 | Navon et al. | |
| 2015/0074337 A1* | 3/2015 | Jo | G06F 3/0679 711/103 |
| 2018/0314421 A1* | 11/2018 | Linkovsky | G06F 3/0679 |
| 2019/0317901 A1* | 10/2019 | Kachare | G06F 3/064 |
| 2020/0285582 A1* | 9/2020 | Palmer | G06F 12/0868 |
| 2021/0181986 A1* | 6/2021 | Lee | G06F 3/064 |
| 2022/0155995 A1* | 5/2022 | Jung | G06F 3/0679 |

OTHER PUBLICATIONS

Díaz et al. "Stream Chaining: Exploiting Multiple Levels of Correlation in Data Prefetching." Jun. 2009. ACM. ISCA'09. pp. 81-92.*
Hashemi et al. "Learning Memory Access Patterns." 2018. Proceedings of the 35 th International Conference on Machine Learning.*

\* cited by examiner

*Primary Examiner* — Nathan Sadler
(74) *Attorney, Agent, or Firm* — Crowell & Moring LLP

(57) ABSTRACT

A data storage device and method for multi-level conditional prediction of future random read commands are provided. In one embodiment, a data storage device is provided comprising a memory and a controller. The controller is configured to receive a random read command from a host, wherein the received random read command is associated with a stream; predict a next stream to be received from the host; and predict a next random read command to be received from the host based on the received random read command and the predicted next stream. Other embodiments are possible, and each of the embodiments can be used alone or together in combination.

20 Claims, 6 Drawing Sheets

DATA STORAGE DEVICE AND METHOD FOR MULTI-LEVEL CONDITIONAL PREDICTION OF FUTURE RANDOM READ COMMANDS

BACKGROUND

A random read refers to the situation in which a data storage device receives a request to read a non-consecutive sequence of addresses in memory, whereas a sequential read refers to the situation in which the data storage device is required to read a large amount of data from consecutive address spaces in memory. To improve the number of input-output operations per second (IOPS) and throughput performance in random read scenarios, a read look ahead (RLA) mechanism can be used to attempt to predict the next read command to be received from a host and pre-fetch that data from the memory.

DETAILED DESCRIPTION

Overview

Figure 1A:
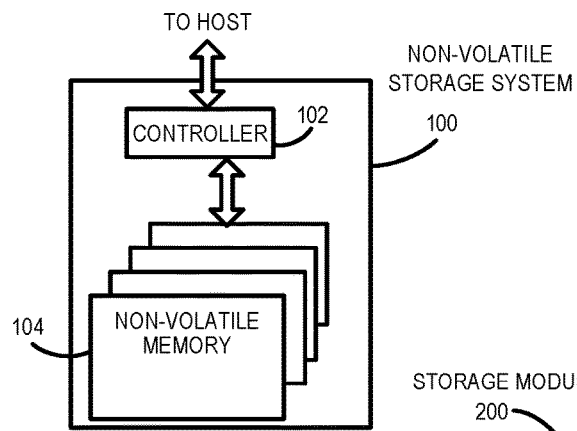
FIG. 1A is a block diagram of a data storage device of an embodiment.

By way of introduction, the below embodiments relate to a data storage device and method for multi-level conditional prediction of future random read commands. In one embodiment, a data storage device is provided comprising a memory and a controller. The controller is configured to receive a random read command from a host, wherein the received random read command is associated with a stream; predict a next stream to be received from the host; and predict a next random read command to be received from the host based on the received random read command and the predicted next stream.

In some embodiments, the stream and the next stream are associated with different ones of at least some of the following: applications, namespaces, user identifiers, host identifiers, zones submission queues, or stream identifiers.

In some embodiments, the controller is further configured to predict the next stream using a stream prediction model.

In some embodiments, the stream prediction model comprises a machine-learning-based prediction model.

In some embodiments, the machine-learning-based prediction model is configured to receive workload statistics as an input.

In some embodiments, the machine-learning-based prediction model is configured to receive power consumption as an input.

In some embodiments, the stream prediction model comprises a statistical-based prediction model.

In some embodiments, the statistical-based prediction model is configured to use counters to track streams.

In some embodiments, the controller is further configured to use a history-pattern-matcher (HPM) to predict the next random read command.

In some embodiments, the controller is further configured to pre-fetch, from the memory, data associated with the predicted next random read command.

In some embodiments, the memory comprises a three-dimensional memory.

In another embodiment, a method is provided that is performed in a data storage device in communication with a host. The method comprises receiving a random read command from the host and using a multi-level random read prediction method to predict a future random read command from the host. The first level of the multi-level random read prediction method identifies a stream associated with the received random read command and predicts a future stream from the host, and the second level of the multi-level random read prediction method predicts the future random read command using the received random read command and the predicted future stream.

In some embodiments, the first level of the multi-level random read prediction method comprises a training/learning stage that tracks and learns repeating patterns of streams.

In some embodiments, the second level of the multi-level random read prediction method comprises an inference/prediction stage that learns repeating random read patterns.

In some embodiments, the stream and the future stream are associated with different ones of at least some of the following: applications, namespaces, user identifiers, host identifiers, zones submission queues, or stream identifiers.

In some embodiments, the multi-level random read prediction method comprises a machine-learning model.

In some embodiments, the multi-level random read prediction method comprises a statistical-based model.

In some embodiments, the multi-level random read prediction method comprises a history-pattern-matcher (HPM).

In some embodiments, the method further comprises pre-fetching, from the memory, data associated with the predicted future random read command.

In another embodiment, a data storage device is provided comprising: a memory; means for receiving a random read command from a host, wherein the received random read command is associated with a stream; means for predicting a next stream to be received from the host; and means for predicting a next random read command to be received from the host based on the received random read command and the predicted next stream.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1B:
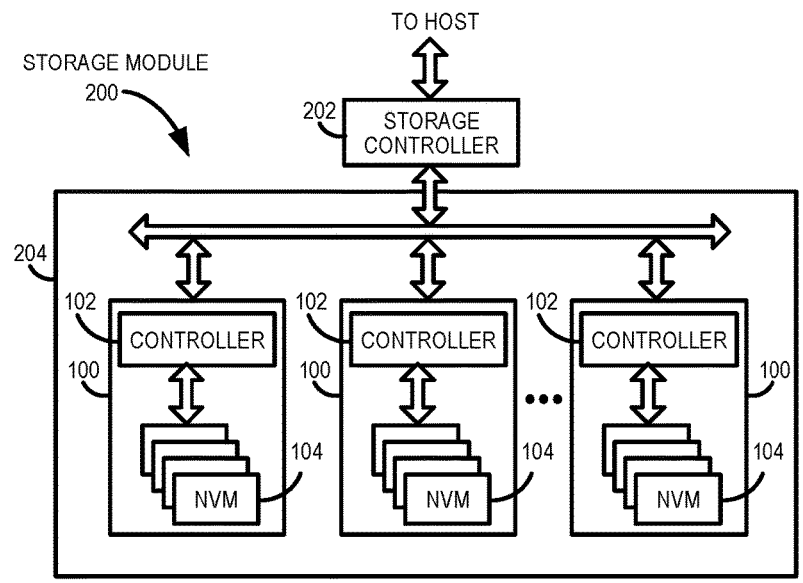
FIG. 1B is a block diagram illustrating a storage module of an embodiment.
Figure 1C:
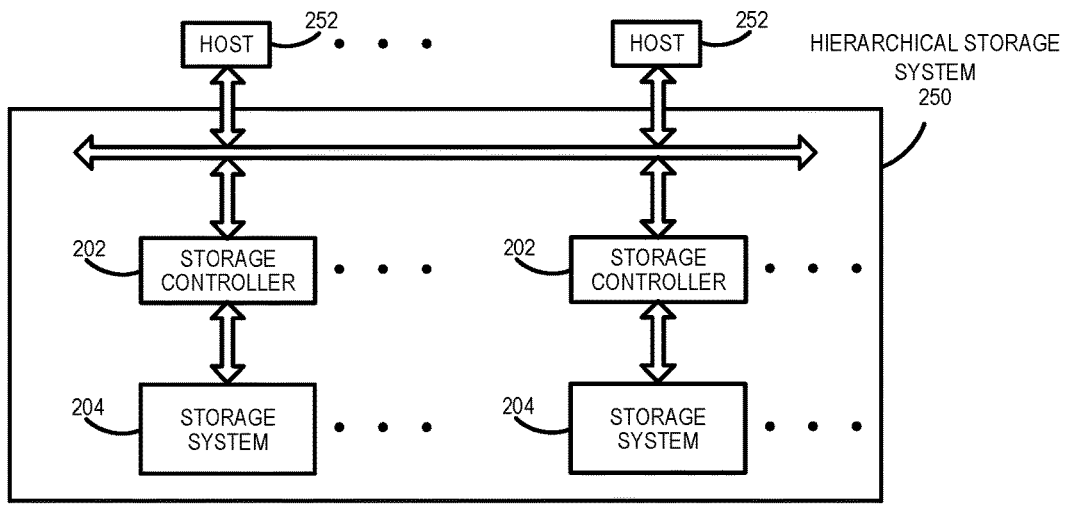
FIG. 1C is a block diagram illustrating a hierarchical storage system of an embodiment.

Data storage devices suitable for use in implementing aspects of these embodiments are shown in FIGS. 1A-1C.

FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
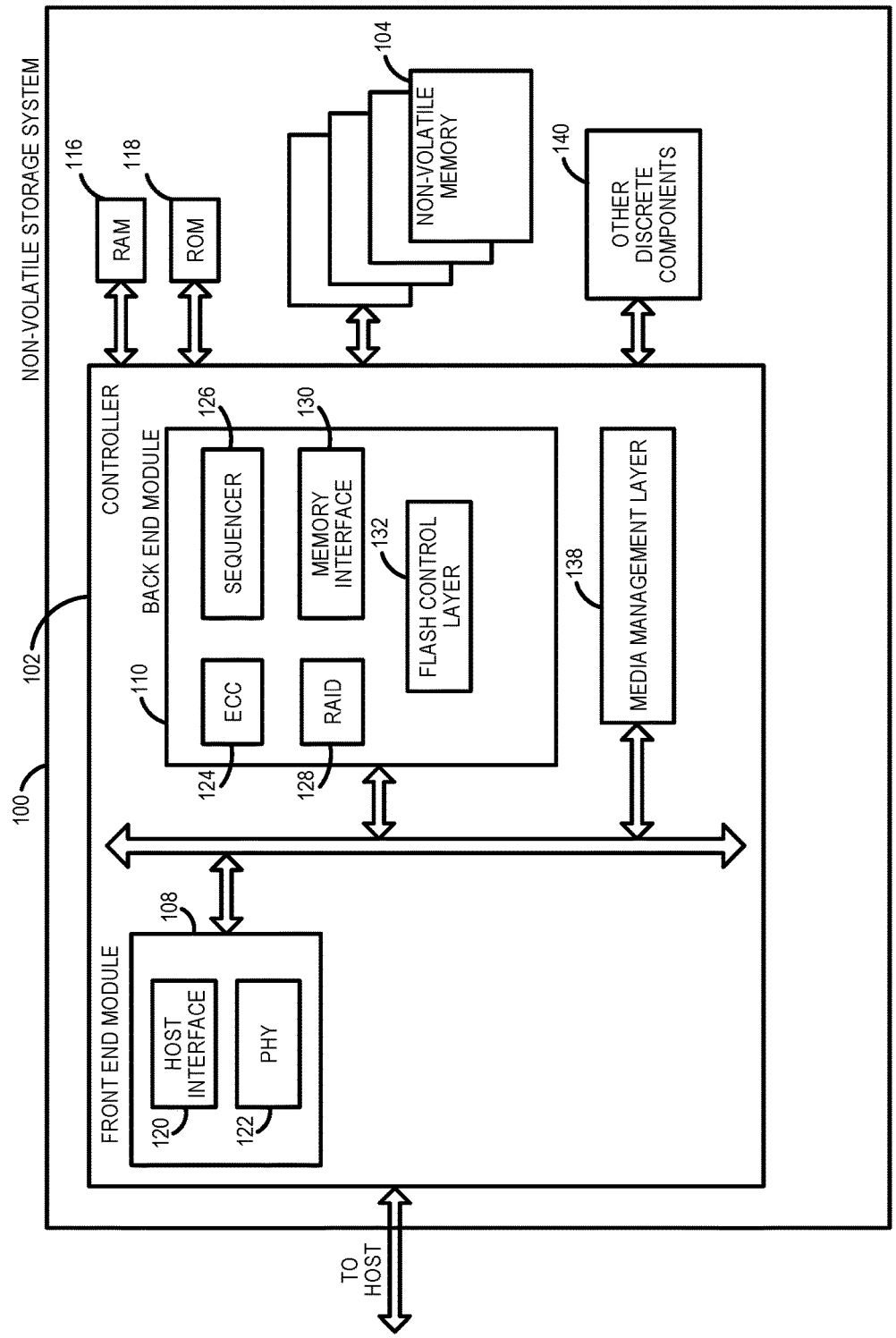
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 1111 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
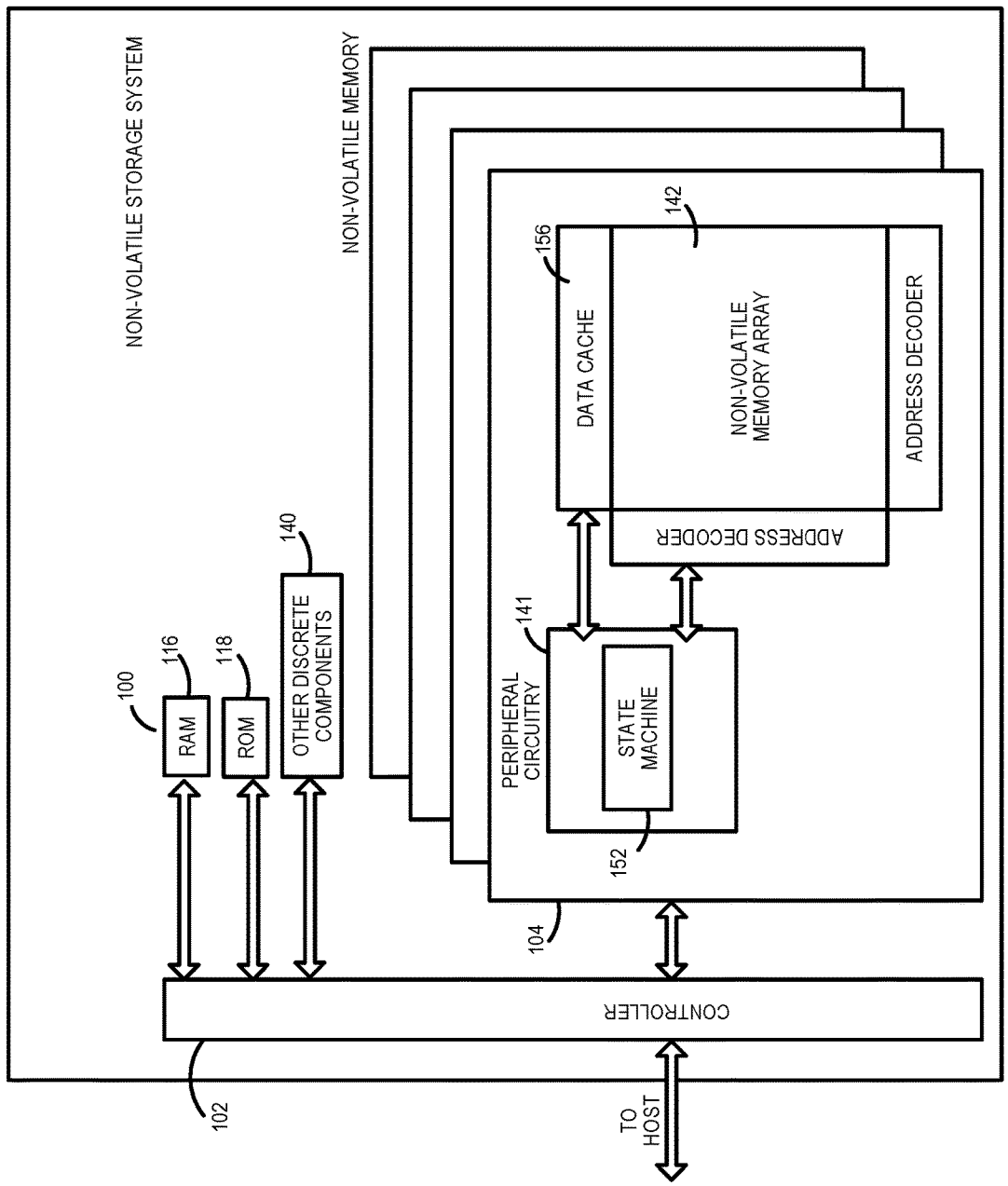
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
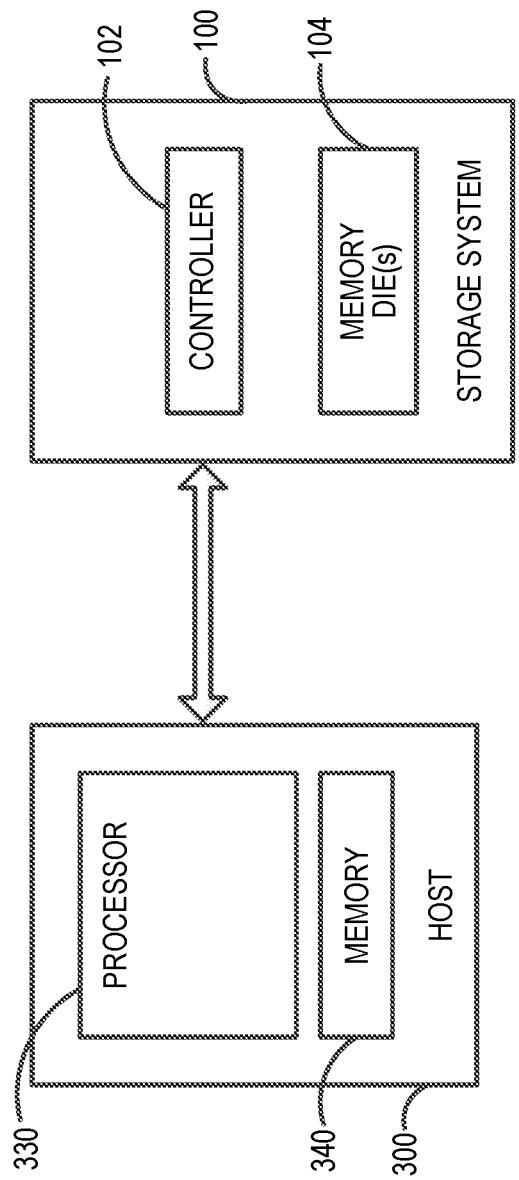
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, a random read refers to the situation in which the data storage device 100 receives a request to read a non-consecutive sequence of addresses in memory 104, whereas a sequential read refers to the situation in which the data storage device 100 is required to read a large amount of data from consecutive address spaces in memory 104. To improve the number of input-output operations per second (IOPS) and throughput performance in random read scenarios, a read look ahead (RLA) mechanism can be used to attempt to predict the next read command to be received from the host 300, pre-fetch that data from the memory 104, and store it in volatile memory (e.g., RAM 116) in the data storage device 100.

Any suitable technique can be used to predict the next read command. For example, U.S. Pat. No. 10,732,848, which is hereby incorporated by reference, discloses a history-pattern-matcher (HPM) mechanism for random read logical block address (LBA) prediction. This mechanism can be used to identify LBA patterns in random read commands and use such patterns to predict the next random read command. The prediction of future random read commands can be used by the controller 102 to do a pre-fetch of the data from the memory 104 for the estimated next commands, either in parallel to other operations or during idle times of the storage system 100. While the HPM mechanism may be referenced in the below examples, it should be understood that other types of techniques to predict the next read command can be used with these embodiments and should not be read into the claims unless expressly recited therein.

More specifically, in one embodiment, a read command received from the host 300 includes a starting logical block address (starting LBA) at which the data being requested begins, as well as a length indicator that identifies the contiguous logical block address range starting at the starting logical block address. Upon receipt of the read command, the controller 102 can update the HPM database to include the starting address and length information. The controller 102 can also generate a search sequence in a search sequence stack stored in the controller memory. The search sequence consists of a sequential list of read address location information from the current read command and from previous N commands, where N may be a predetermined fixed integer. Using the search sequence with the current search command search address information that has been generated and stored in the search sequence buffer, the controller 102 can search for any occurrences of the search sequence that appear in the HPM database.

If at least one match is found to the search sequence in the read command database, the controller 102 can retrieve the address value in the read command data, which can be considered to be the predicted location of data that is expected to be requested in the next read command. The controller 102 can then pre-fetch the data at that identified address and store the pre-fetched data in volatile memory in anticipation of the next read command that will ask for that data. If the next read command does ask for that pre-fetched data, then significant time has been saved, and the pre-fetched data may be immediately sent to the host 300. If the next read command does not request the pre-fetched data, then a regular read operation for the data requested in the read command can be executed, and the pre-fetched data is simply discarded or written over.

If, instead of finding a match between the search sequence and entries of the read command history database, no match is found, then a pre-fetch operation may be skipped or some other pre-fetch address selection scheme may be used as a default, such as the controller pre-fetching data at the next sequentially-contiguous address after the last address of data retrieved for the prior read command. The accuracy and amount of time it takes to predict the next random read command and pre-fetch the data for that predicted next read command may be adjusted by adjusting the size of the RPM database and the size of the search sequence buffer. The larger the HPM database, the more likely it may be to find a match.

While the concept of prediction of future next random read commands is based on repeating patterns, it should be noted that such repeating patterns of random read commands (or any other command patterns) are conceptually different per each specific use-case. These different use-cases can include, for example, different applications (e.g., a game, a movie player, an Internet browser, operating system (OS) commands, a spreadsheet application, etc.), different namespaces, different user/host identifiers (IDs), etc. (The term "stream" will be used herein to describe specific types of use-cases.) Therefore, the efficiency of predicting future random read commands depends on knowing which application/user/workload is expected to appear.

Using the concept of learning repeating patterns for the sake of random read commands prediction can be efficient when the use-case/stream is known. However, while this concept can also be used to track different patterns for different streams, not knowing the stream pattern can adversely affect efficiency when the data storage device 100 operates with several streams. The following embodiments can be used to address this situation by providing a smart estimation of the origin streams of the future commands by providing a hint of which stream pattern should be used. If the data storage device 100 can reliably estimate the expected stream to which incoming commands belong, it can better avoid misestimation of the prediction of expected commands.

In one embodiment, the controller 102 of the data storage device 100 implements a multi-level random read ("RR") prediction method that includes a first layer that predicts/estimates the future stream/use-case and a conditional second layer for predicting the repeating patterns of random read commands, given that a specific use-case/stream is known. This will be referred to herein as a multi-level conditional prediction of future random read commands. As noted above, the repeating patterns of random read workloads can be specific for each use-case/stream. Examples of different streams include, but are not limited to, different applications (e.g., a game, a movie player, an Internet browser, operating system (OS) commands, a spreadsheet, etc.), different namespaces, different user/host identifiers (e.g., either a physical or virtual function), different zones in a zoned namespace (ZNS) protocol, different submission queues, and different NVMe stream IDs.

In one embodiment, the controller 102 uses a combined multi-level prediction approach for random read commands that includes a training/learning stage and an inference/prediction stage. In the training/learning stage, the controller 102 tracks and learns repeating patterns of streams (the "first level model") and, for each stream, learns the repeating random read patterns (the "second level model"). In the inference/prediction stage, for each stream, the controller 102 uses the first level model for predicting the expected future streams. Given results of that stage, the controller 102 uses the specific second level model for predicting the future random read commands.

Figure 4:
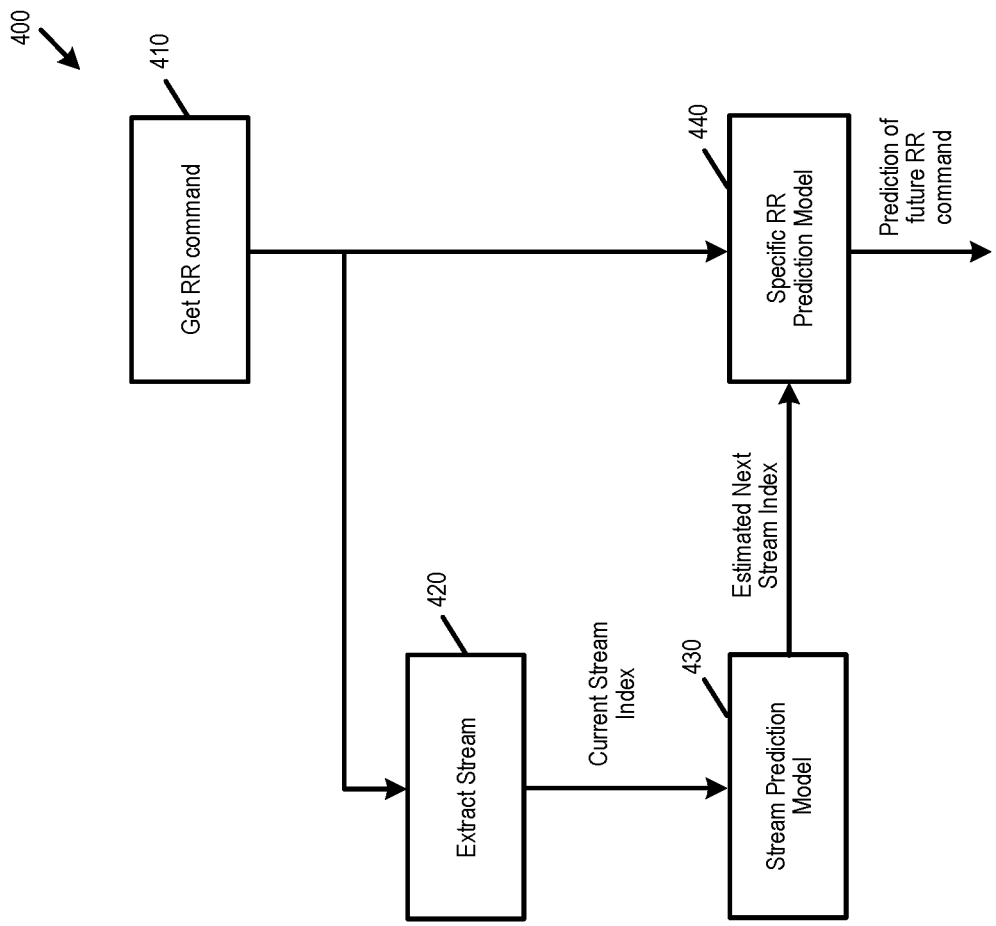
FIG. 4 is a flow chart of a method of an embodiment for multi-level conditional prediction of future random read commands.

Returning to the drawings, FIG. 4 is a flow chart 400 that illustrates this method. As shown in FIG. 4, the controller 102 receives a random read command (act 410). The controller 102 then extracts the stream (act 420) and provides a current stream index to a stream prediction model (act 420). The stream prediction model (act 420) estimates a next stream index and provides it to a specific random read prediction model (act 430). Using the estimated next stream index and the received random read command, a prediction of a future random read command is made (act 440).

Figure 5:
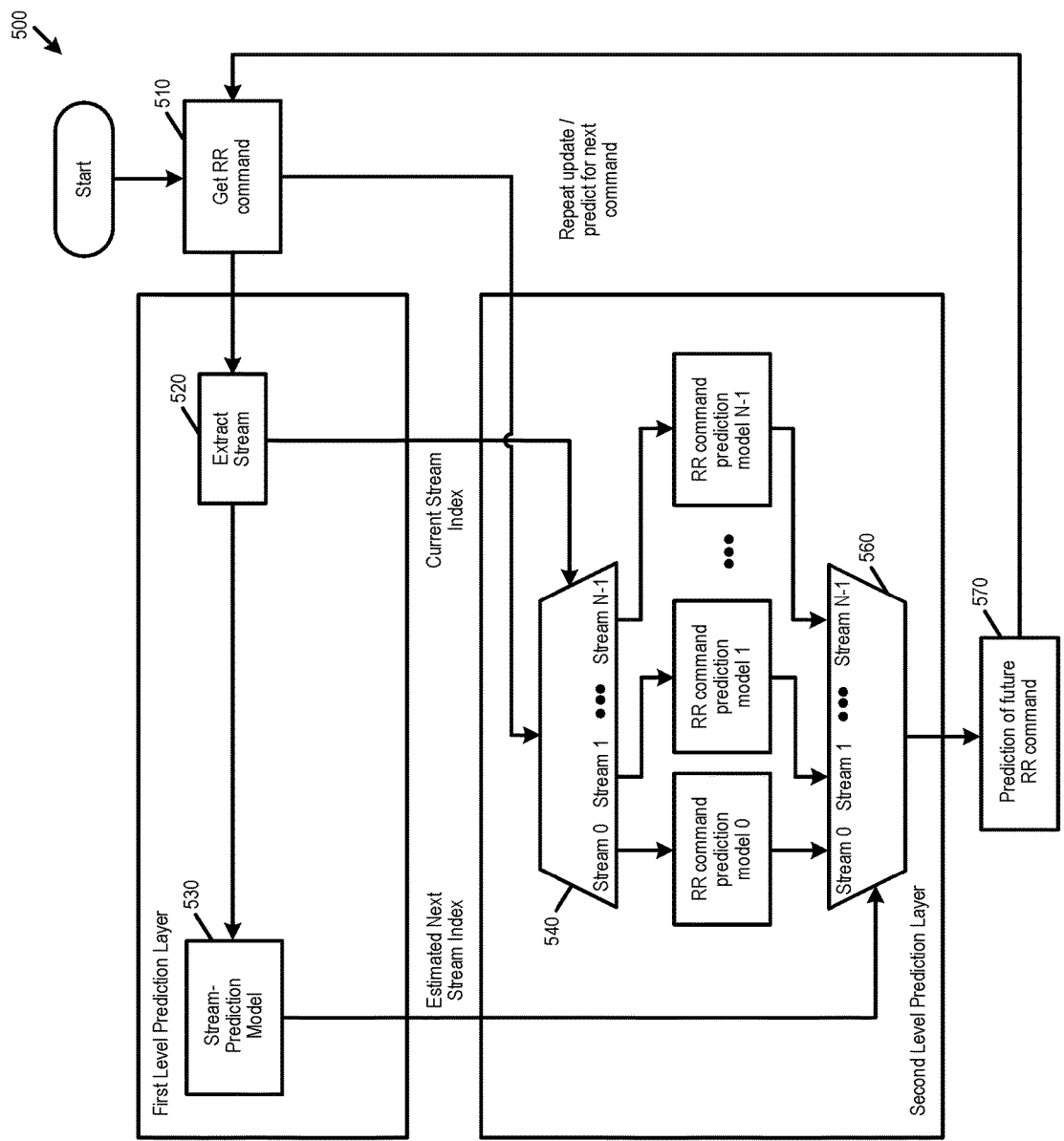
FIG. 5 is a schematic flow chart of a method of an embodiment for multi-level conditional prediction of future random read commands.

FIG. 5 is a schematic flow chart 500 that describes this process in more detail. In this example, the controller 102 implements first and second level prediction layers, which can be implemented by software (computer-readable program code) or hardware. As shown in FIG. 5, after the controller 102 receives a random read command (act 510), the controller 102 extracts the stream (act 520) and provides it to a stream prediction model (act 530). The stream prediction model can be, for example, a machine-learning-based prediction model or a statistical-based model that will provide an estimation for the most-probable stream to come based on late stream prediction frequency. The current stream index from the extracted stream is provided to a multiplexor 540 that supports N different streams. Each stream is associated with a random read command prediction model, the outputs of which are provided to another multiplexor 560 that uses the estimated next stream index as a selector to output a prediction of a future random read command (act 570). That is, in this example, several random read prediction models are held at the second prediction layer. These models can be routed and accessed according to the prediction results of the first prediction layer of stream estimation/prediction. This prediction can be used by the controller 102 for a pre-fetch of future random read commands.

As noted above, in one embodiment, the first level stream prediction/estimation model can either be based on simple statistics collection or be based on a more-complicated machine learning (ML) model. The statistical approach can include, for example, several counters that will track the statistics of the most-frequent streams that appeared recently. The internal structure of the more-advanced ML-based stream prediction model can be based on more inputs/features than just a streams index. Those additional features can include, but are not limited to, workload statistics (e.g., a ratio of random-sequential commands, different commands rates, idle time statistics, etc.) and power consumption (if available). The second level prediction model can be, for example, hash-based for repeating pattern recognition or include other ML-based or statistical models for predicting the future random read commands given that the specific future stream is known (as it is the output from first level prediction stage).

In one example implementation, a history-pattern-matcher (HPM) block is an application-specific integrated circuit (ASIC) hardware block that supports tracking the repeating patterns of different streams (e.g., an extended namespace (ENS) but does not include the capability to indicate the origin streams of estimated future random read commands. In one embodiment, a last-recently-used ENS is used to provide a relevant random read prediction to the controller 102 (firmware-based tracking of the expected future ENS related commands can be performed). In another embodiment, the prediction layers are used to define different algorithms for the lower layers. For instance, a unique prediction method can be used per stream, and the upper layer can select the winner as a candidate for the next random read command prediction. In yet another embodiment, more than two prediction layers are defined, which can increase accuracy in some workloads.

There are several advantages associated with these embodiments. For example, these embodiments can provide more-accurate prediction results and improve hit-rate in multi-streams environment, which can provide better performance, reduced random read latency, an increased number of input-output operations per second, and reduced power consumption. Further, these embodiments allow different prediction algorithms to be utilized in the lower prediction layers that are adapted to the relevant stream.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, (i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
   a memory; and
   a controller configured to:
   receive a random read command from a host, wherein the received random read command is associated with a stream;
   predict a next stream to be received from the host;
   predict a next random read command to be received from the host based on the received random read command and the predicted next stream; and
   pre-fetch, from the memory, data associated with the predicted next random read command.

2. The data storage device of claim 1, wherein the stream and the predicted next stream are associated with different applications.

3. The data storage device of claim 1, wherein the controller is further configured to predict the next stream using a stream prediction model.

4. The data storage device of claim 3, wherein the stream prediction model comprises a machine-learning-based prediction model.

5. The data storage device of claim 4, wherein the machine-learning-based prediction model is configured to receive workload statistics as an input.

6. The data storage device of claim 4, wherein the machine-learning-based prediction model is configured to receive power consumption as an input.

7. The data storage device of claim 3, wherein the stream prediction model comprises a statistical-based prediction model.

8. The data storage device of claim 7, wherein the statistical-based prediction model is configured to use counters to track streams.

9. The data storage device of claim 1, wherein the controller is further configured to use a history-pattern-matcher (HPM) to predict the next random read command.

10. The data storage device of claim 1, wherein the memory comprises a three-dimensional memory.

11. The data storage device of claim 1, wherein the stream and the next stream are associated with different ones of at least some of the following: namespaces or zones submission queues.

12. The data storage device of claim 1, wherein the stream and the next stream are associated with different ones of at least some of the following: user identifiers, host identifiers, or stream identifiers.

13. A method comprising:
   performing the following in a data storage device in communication with a host:
   receiving a random read command from the host;
   using a multi-level random read prediction method to predict a future random read command from the host and
   pre-fetching, from a memory in the data storage device, data associated with the predicted future random read command;
   wherein:
   a first level of the multi-level random read prediction method identifies a stream associated with the received random read command and predicts a future stream from the host; and
   a second level of the multi-level random read prediction method predicts the future random read command using the received random read command and the predicted future stream.

14. The method of claim 13, wherein the first level of the multi-level random read prediction method comprises a training/learning stage that tracks and learns repeating patterns of streams.

15. The method of claim 13, wherein the second level of the multi-level random read prediction method comprises an inference/prediction stage that learns repeating random read patterns.

16. The method of claim 13, wherein the stream and the predicted future stream are associated with different ones of at least some of the following: applications, namespaces, user identifiers, host identifiers, zones submission queues, or stream identifiers.

17. The method of claim 13, wherein the multi-level random read prediction method comprises a machine-learning model.

18. The method of claim 13, wherein the multi-level random read prediction method comprises a statistical-based model.

19. The method of claim 13, wherein the multi-level random read prediction method comprises a history-pattern-matcher (HPM).

20. A data storage device comprising:
- a memory;
- means for receiving a random read command from a host, wherein the received random read command is associated with a stream;
- means for predicting a next stream to be received from the host;
- means for predicting a next random read command to be received from the host based on the received random read command and the predicted next stream; and
- means for pre-fetching, from the memory, data associated with the predicted next random read command.

* * * * *